US012741586B2

(12) United States Patent
Blankenship

(10) Patent No.: US 12,741,586 B2
(45) Date of Patent: Sep. 22, 2026

(54) VEHICULAR BACKUP SAFETY SYSTEM

(71) Applicant: Ross Blankenship, Edwards, CO (US)

(72) Inventor: Ross Blankenship, Edwards, CO (US)

( * ) Notice: Subject to any disclaimer, the term of this patent is extended or adjusted under 35 U.S.C. 154(b) by 0 days.

(21) Appl. No.: 18/424,812

(22) Filed: Jan. 28, 2024

(65) Prior Publication Data

US 2025/0242750 A1 Jul. 31, 2025

(51) Int. Cl.
*B60Q 1/50* (2006.01)
*B60Q 1/22* (2006.01)
*B60Q 1/26* (2006.01)

(52) U.S. Cl.
CPC ................. *B60Q 1/50* (2013.01); *B60Q 1/22* (2013.01); *B60Q 1/2603* (2013.01)

(58) Field of Classification Search
CPC ........... B60Q 1/50; B60Q 1/22; B60Q 1/2603
See application file for complete search history.

(56) References Cited

U.S. PATENT DOCUMENTS 4,916,430 A * 4/1990 Vu ....................... B60Q 1/2665 362/135
5,568,137 A * 10/1996 Liu ...................... G05D 1/0246 250/397
6,153,985 A * 11/2000 Grossman .............. H05B 45/10 315/156
6,271,813 B1 * 8/2001 Palalau .................... H04N 5/58 345/207
6,459,083 B1 * 10/2002 Finkele .................. G01N 21/55 250/339.1
6,842,111 B1 * 1/2005 Smithson ................. B60Q 1/46 340/331
7,002,460 B2 * 2/2006 Bolander ................. B60Q 1/22 340/463
7,498,686 B2 * 3/2009 Capenos .................. B60Q 1/24 307/9.1
7,653,215 B2 * 1/2010 Stam ...................... B60Q 1/085 382/104
7,755,595 B2 * 7/2010 Ferguson ............. G09G 3/3406 345/102
8,280,593 B2 * 10/2012 Nakakura ............... E05F 15/43 701/49
8,842,176 B2 * 9/2014 Schofield .................. B60R 1/30 348/113
9,849,829 B1 * 12/2017 Salter ...................... F21S 43/26
9,956,903 B2 * 5/2018 Gondhi .................... B60Q 1/22
10,202,070 B1 * 2/2019 Bellew ..................... B60Q 1/44
10,421,391 B2 * 9/2019 Kim ....................... B60Q 1/085
10,609,784 B1 * 3/2020 Refsdal .................. H05B 47/11
10,723,258 B2 * 7/2020 Salter .................. B60Q 1/2665
10,889,235 B2 * 1/2021 Sassoon .................. F21S 43/19
11,594,199 B2 * 2/2023 Yung ........................ G09G 5/10
12,012,033 B2 * 6/2024 Paradis ................ B60Q 1/2696
12,028,951 B2 * 7/2024 Xu .......................... H05B 45/12
12,304,310 B2 * 5/2025 Sharma .................. B60K 35/23
2002/0063638 A1 * 5/2002 Gallagher ............ G01M 11/005 340/901
2002/0175813 A1 * 11/2002 Ross ....................... G01S 7/497 340/555

(Continued)

*Primary Examiner* — Hoi C Lau
(74) *Attorney, Agent, or Firm* — Robert Brownstein

(57) ABSTRACT

The invention is a vehicular backup safety system that provides a reflected light pattern on a horizontal surface area, on the ground, behind a vehicle that is placed into reverse mode.

4 Claims, 7 Drawing Sheets

(56) References Cited

U.S. PATENT DOCUMENTS

2003/0189500 A1* 10/2003 Lim ..................... G08G 1/04 348/148
2004/0036586 A1* 2/2004 Harooni ............... G01S 17/931 180/167
2004/0257214 A1* 12/2004 Smithson ............... B60Q 1/46 340/468
2005/0057701 A1* 3/2005 Weiss ................ G02B 27/0101 349/10
2005/0073397 A1* 4/2005 Zheng ..................... B60Q 1/48 340/436
2006/0007107 A1* 1/2006 Ferguson ............. G09G 3/3406 345/102
2006/0214781 A1* 9/2006 Terzian ................. B60Q 1/302 340/471
2006/0267745 A1* 11/2006 Larson ..................... B60D 1/36 340/431
2008/0030374 A1* 2/2008 Kumon .................. G08G 1/166 340/937
2008/0129541 A1* 6/2008 Lu .......................... G06V 20/56 340/905
2008/0272699 A1* 11/2008 Capenos ............ H01R 13/7039 315/77
2008/0291015 A1* 11/2008 Charles .................. A61B 90/37 340/540
2009/0034280 A1* 2/2009 Rosenstein .......... B60Q 1/2603 362/512
2009/0146842 A1* 6/2009 Jung ....................... G01S 17/42 340/932.2
2009/0243819 A1* 10/2009 Pala ..................... B60K 35/215 340/425.5
2011/0128141 A1* 6/2011 Purks ..................... B60Q 1/381 340/475
2014/0049405 A1* 2/2014 Breuer .................. G01N 21/35 340/905
2014/0118111 A1* 5/2014 Saladin .................. E05F 15/77 340/7.51
2014/0224961 A1* 8/2014 Nelson ..................... G01J 1/46 250/206
2015/0084779 A1* 3/2015 Saladin .................. E05F 15/77 340/686.6
2015/0345938 A1* 12/2015 Salter .................. H05B 47/105 356/138
2016/0096474 A1* 4/2016 Sakai ..................... B60Q 9/008 356/5.01
2016/0114726 A1* 4/2016 Nagata .................. B60Q 9/007 340/435
2016/0185283 A1* 6/2016 Weiner ..................... B60Q 1/44 340/469
2016/0221493 A1* 8/2016 Okamoto ................. B60Q 1/50
2016/0266242 A1* 9/2016 Gilliland ............... G01S 17/931
2016/0332562 A1* 11/2016 Kim ..................... B60Q 1/0076
2017/0106784 A1* 4/2017 Gondhi .................... B60Q 1/22
2017/0106793 A1* 4/2017 Kumar ..................... B60Q 1/48
2017/0210276 A1* 7/2017 DeCote .................... B60Q 1/46
2018/0031707 A1* 2/2018 Graf ...................... G01S 17/931
2018/0043819 A1* 2/2018 Kim ....................... B60Q 1/085
2018/0334099 A1* 11/2018 Gao .......................... B60R 1/23
2019/0106058 A1* 4/2019 Salter .................. B60Q 1/2665
2019/0242983 A1* 8/2019 Yokota .................. G01S 7/4815
2020/0164814 A1* 5/2020 Solar .................... G06V 10/145
2020/0214111 A1* 7/2020 Refsdal .................. H05B 47/19
2021/0197711 A1* 7/2021 Sassoon .................. F21S 43/14
2021/0223778 A1* 7/2021 Endo ........................ G01C 3/06
2021/0229594 A1* 7/2021 Roychowdhury ..... H05B 45/12
2022/0351704 A1* 11/2022 Yung ........................ G09G 5/10
2023/0073997 A1* 3/2023 Xu ......................... H05B 45/12
2023/0230387 A1* 7/2023 Herman ................. G06V 20/56 701/25
2023/0382294 A1* 11/2023 Paradis .................... B60Q 1/22
2024/0391316 A1* 11/2024 Sharma .................. B60K 35/23
2024/0391377 A1* 11/2024 Akimoto .............. B60Q 1/0023
2025/0242750 A1* 7/2025 Blankenship100 ...... B60Q 1/50

* cited by examiner

VEHICULAR BACKUP SAFETY SYSTEM

TECHNICAL FIELD

The invention is a system for adding safety to a vehicle backing out of a parking-lot space and avoiding collisions with another vehicle moving transversely through the aisle.

BACKGROUND OF INVENTION

One of the factors that causes a significant degree of vehicle collisions is the failure to see a vehicle backing out of a parking lot parking space into an aisle while a second vehicle is traveling toward the first vehicle in that aisle.

In a situation where a parked vehicle is blocked from view by another parked vehicle, and is attempting to reverse out of a parking slot into an aisle, until a driver of a second vehicle moving down that aisle sees the first vehicle in motion, there is a significant likelihood of the vehicle in the aisle colliding with the rear end of the first vehicle, or the first vehicle colliding with side of the second vehicle.

The likelihood of such collisions increases during the day under bright daylight conditions. The car in the aisle cannot be seen by the driver reversing out of the slot, and the driver in the aisle car cannot readily see either the brake lights or backup lights because they are transverse to his position and weakened by ambient light.

Under darkness conditions, it is a bit easier to see the reversing vehicles brake lights, but since brake lights and backup lights are focused essentially horizontal to the parking lot surface, the driver of the aisle car would have to be looking to the right in order to see either light, and could be unlikely to see either if looking straight ahead.

For decades, vehicles have had backup lights that illuminate when a vehicle is in reverse gear and extinguish when out of reverse gear. These lights, however, are intended to illuminate the area behind the vehicle but not the ground behind the vehicle. Brake lights, too, are not intended to focus light downward and backward, just backward.

Thus, such accidents are most likely to happen during bright daylight when aisle-car drivers cannot detect that a parked car is attempting to reverse out of the parking slot.

BRIEF DESCRIPTION OF INVENTION

The invention is a system operative to turn on and off with a vehicle's installed backup lights but operative to project a highly visible light pattern in an area behind the reversing vehicle.

High-intensity light sources and lensing produces converging beams of light that are focused out and down behind the reversing vehicle. The intensity of light projected onto the ground behind the reversing vehicle extends out a distance that would enable it to illuminate the surface of the ground in the aisle before the vehicle begins moving. Thus, as soon as the vehicle has been put in reverse gear, and even before it begins moving, its backup safety system will make it apparent to a driver of a car moving along the aisle that a car is in the process of reversing out of its spot.

The backup safety system has sufficient high-intensity light sources to ensure that the illuminated surface area has sufficient light intensity to be seen in the brightest daylight conditions.

An added capability is ongoing detection of the light intensity by a sensor which continuously conveys intensity data to a light-source control system such that a predetermined level of intensity is maintained under all light conditions. Using the sensor data, the control system will either increase or decrease high-intensity light output to maintain that predetermined intensity level.

DETAILED DESCRIPTION OF INVENTION

Figure 1:
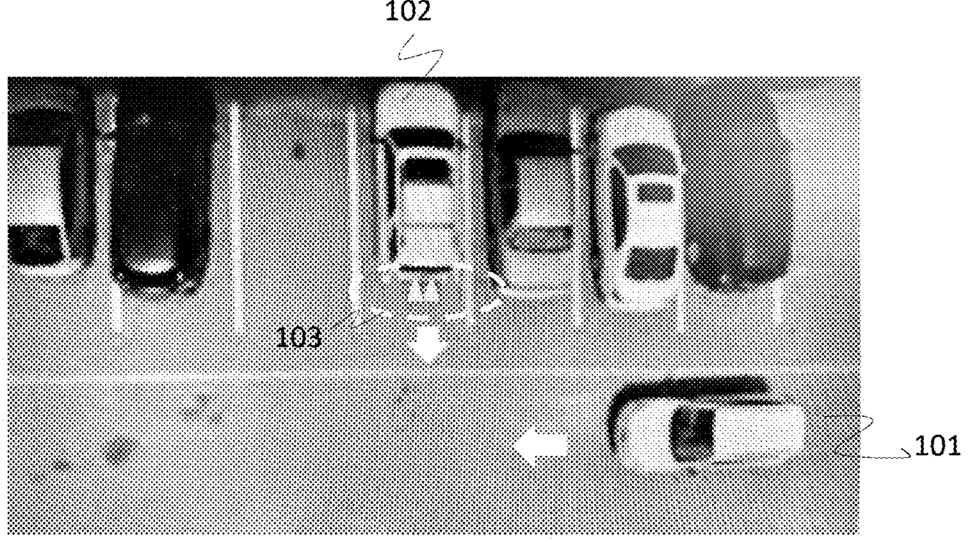
FIG. 1 shows a first vehicle reversing out of a parking slot, during daylight conditions, while a second vehicle is traveling transversely down the aisle toward the first vehicle.

Statistics show that one cause of frequent, non-fatal, accidents are collisions between vehicles moving along a parking-lot aisle with vehicles reversing out of parking spaces into that aisle.

In general, with a vehicle aside the reversing vehicle and blocking the view of the driver of the aisle vehicle, the aisle-vehicle driver will not see the reversing vehicle until its rear end has moved beyond the vehicle aside it.

During daylight, especially on bright days, the detection of brake light or backup light on the reversing vehicle, by the driver in the aisle vehicle, is difficult. The lights are aimed essentially horizontal and rearward, a direction that is transverse to the aisle drivers line of sight. Even under darkness conditions, although the brake lights and backup lights are more detectable against ambient light, they are still aimed horizontally and transverse to the aisle-car driver's line of sight.

If a reversing vehicle, though still blocked from view by an intervening parked vehicle, could indicate to aisle-car drivers that it is reversing out of its parking spot, the aisle-car drivers would have more warning and time to react, therefore significantly preventing such accidents.

The problem to overcome is that light aimed transversely to a line of sight is difficult to detect. It would be easier to detect if it was projected onto a surface that reflects the light in many different directions and angles.

The backup safety system invention does just that. Only when a vehicle is reversing, in sync with the regular backup lights, the backup safety system produces and focuses a high-intensity light pattern onto the ground behind a reversing vehicle such that it will jut out far enough to be seen before the backing-up vehicle even begins to move. In essence, as soon as it is placed in reverse gear, the backup safety system illuminates an area of ground, behind the vehicle, and far enough out to be unblocked by any intervening parked vehicle.

Therefore, an aisle-car driver will see, on the ground, essentially extending into the aisle, a distinctive illuminated area that indicates a vehicle in the process of reversing out of its parking space.

If the illumination was fixed by a constant number of light sources and intensity, it would be more visible at night than during the day because of the effect of ambient light. To overcome that, the backup safety system is operative to produce a readily discernable illuminated area during daylight ambient light, and maintain that same level of reflected intensity under darkness conditions. It does so by creating a closed loop wherein a light-source control subsystem receives reflected light intensity data from the illuminated area, and controls the number of sources and intensity to maintain an essentially constant reflected light intensity regardless of ambient light.

The following description, in combination with the drawings, is meant to provide a more detailed description of the invention and its utility.

FIG. 1 shows an aisle car (101) traveling to the left along an aisle while parked car (102) begins to reverse out of its parking space. It is daytime, so the aisle car's headlights are off, and the brake light and backup light (103) of the parked vehicle are both pointed transverse to the aisle-car drivers line of vision, and muted in discernibility by the ambient daylight.

Figure 2:
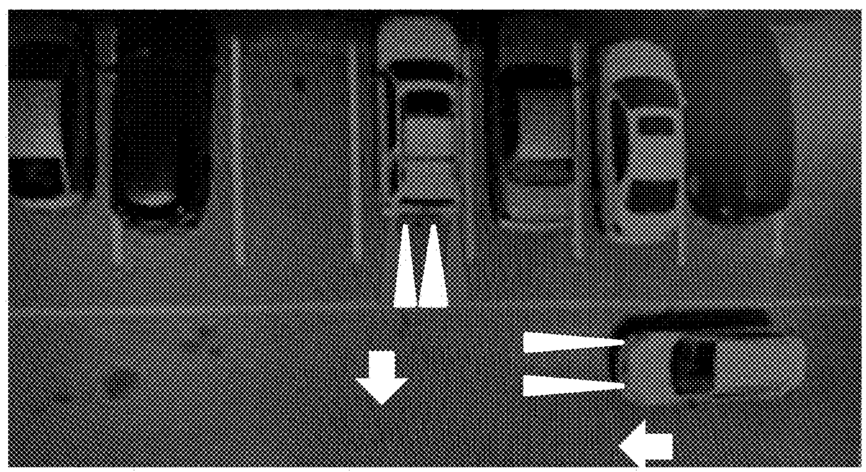
FIG. 2 shows a first vehicle reversing out of a parking slot, during darkness conditions, while a second vehicle is traveling transversely down the aisle toward the first vehicle.

In FIG. 2, the same two vehicles are now doing the same as before but under darkness conditions. The aisle-vehicle's headlights are on, and the now reversing vehicle's brake lights and backup light appear brighter in contrast to the ambient light, but are still pointed essentially horizontal and transverse to the aisle-car driver's line of vision.

Figure 3:
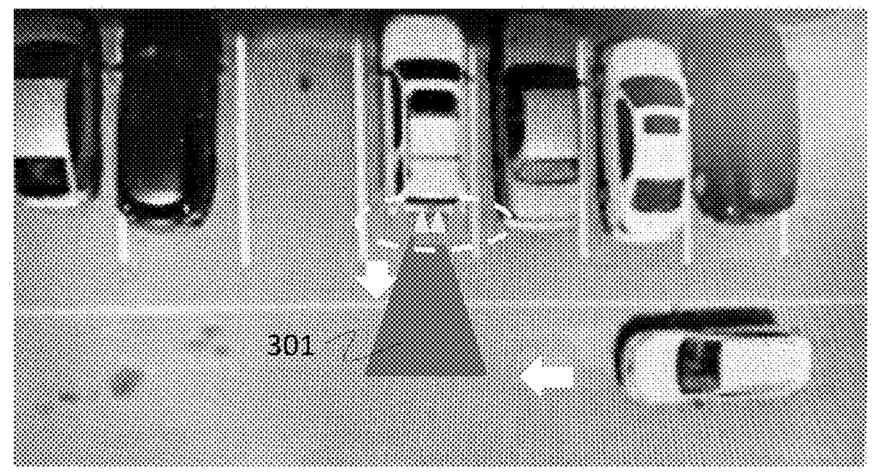
FIG. 3 depicts a case where the first vehicle in FIG. 1 is equipped with the backup safety system illuminating the surface behind it during daylight.

In FIG. 3, the same scenario as in FIG. 1 is duplicated but the reversing vehicle, equipped with the backup safety system, is projecting a high-intensity light pattern (301) onto the ground behind the vehicle. Note also that area 301 extends beyond the vehicle parked to the reversing-vehicle's right. As such, even before that reversing vehicle begins moving, the driver in the aisle car is able to see the pattern illuminated on surface extending into the aisle.

Figure 4:
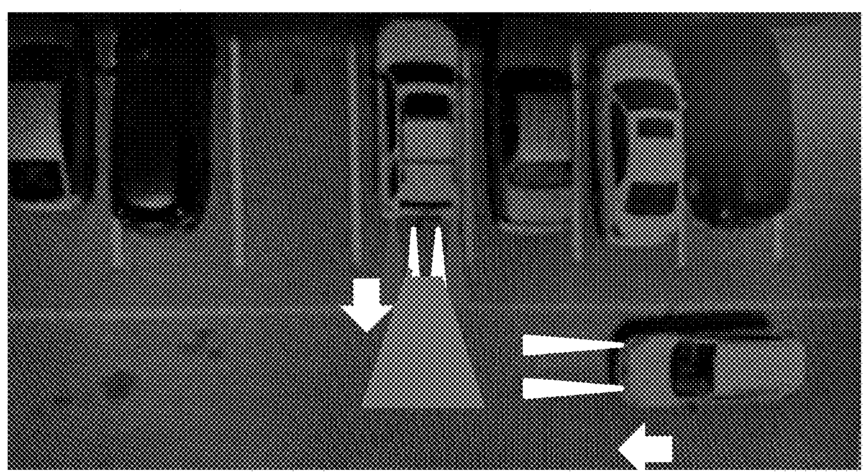
FIG. 4 depicts a case where the first vehicle in FIG. 2 is equipped with the backup safety system illuminating the surface behind it during nighttime conditions.

FIG. 4 shows the reversing vehicle and aisle vehicle under nighttime conditions. Here the aisle vehicle has its headlines illuminated, and the brake light and backup light appear brighter, but neither the headlights nor brake lights nor backup lights are focused down and to the rear, so they will hardly affect the discernibility of the backup safety system's surface pattern.

Figure 5:
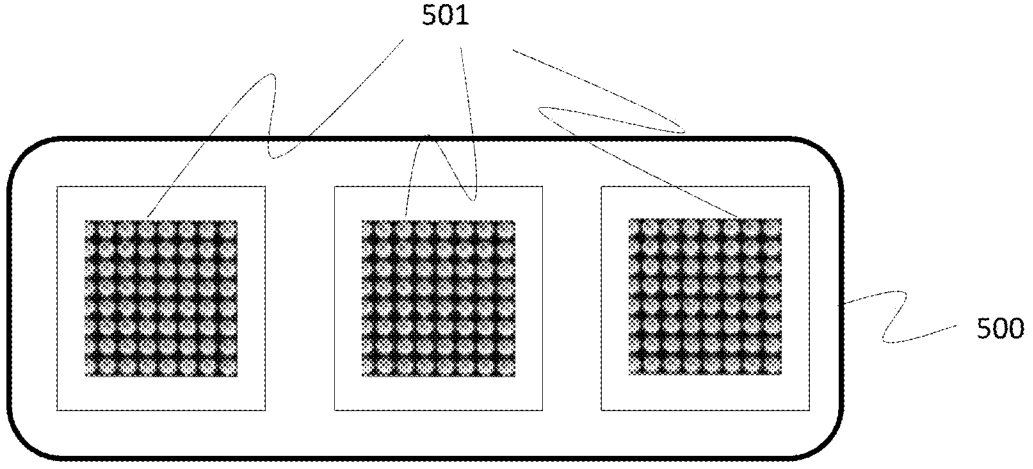
FIG. 5 shows a front view of an embodiment of the high-intensity light source subsystem of the backup safety system.

FIG. 5 shows an embodiment of the invention comprising an enclosure (500) and a plurality of light sources (501) from a view toward the reversing vehicle's back end.

Figure 6:
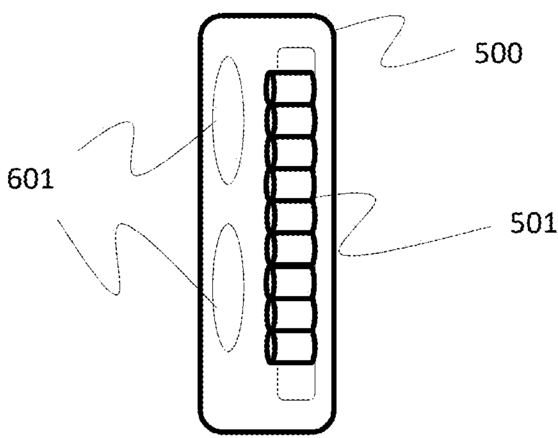
FIG. 6 shows a side view of the embodiment of the high-intensity light source subsystem of the backup safety system.

FIG. 6 shows the embodiment of FIG. 5 from a side view wherein the light source output passes through a lensing system (601) operative to combine the beams and focus them downward so as to produce a reflected light pattern on the ground to the rear of the vehicle.

Figure 7:
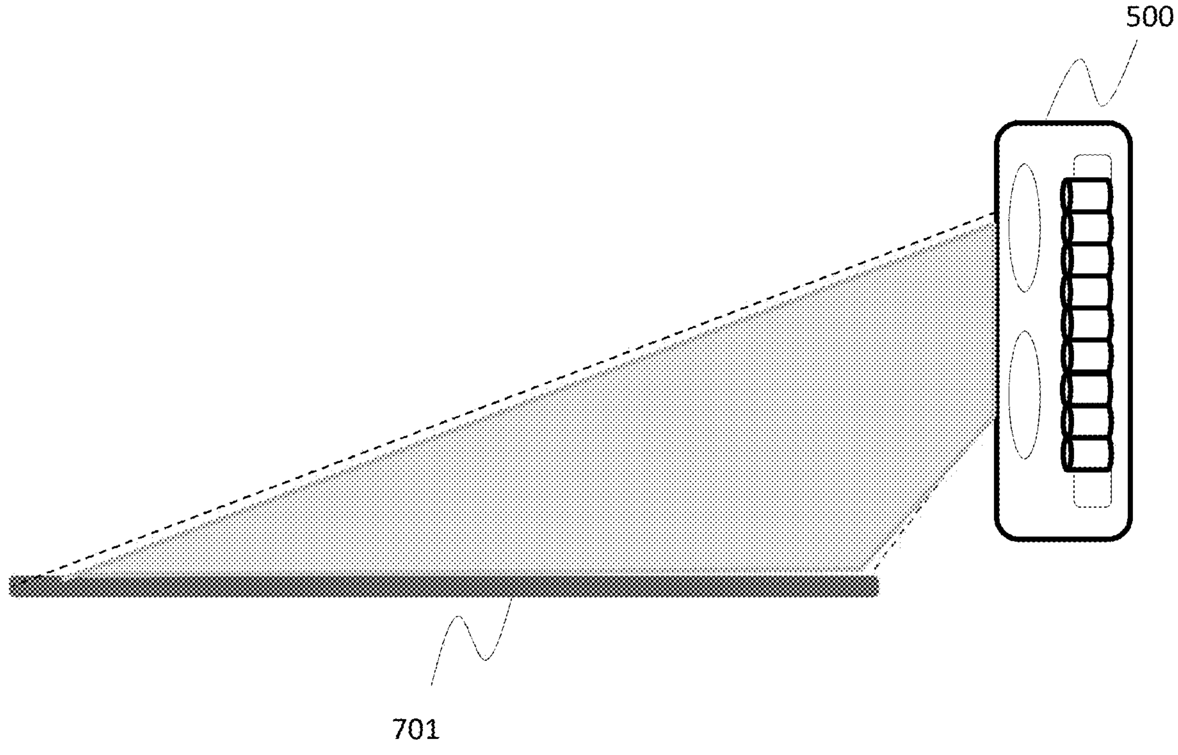
FIG. 7 shows the embodiment of FIG. 6 illuminating the surface area.

FIG. 7 shows the same view as FIG. 6 further illustrating how the lensing subsystem produces the light pattern (701) on the horizontal surface.

Figure 8:
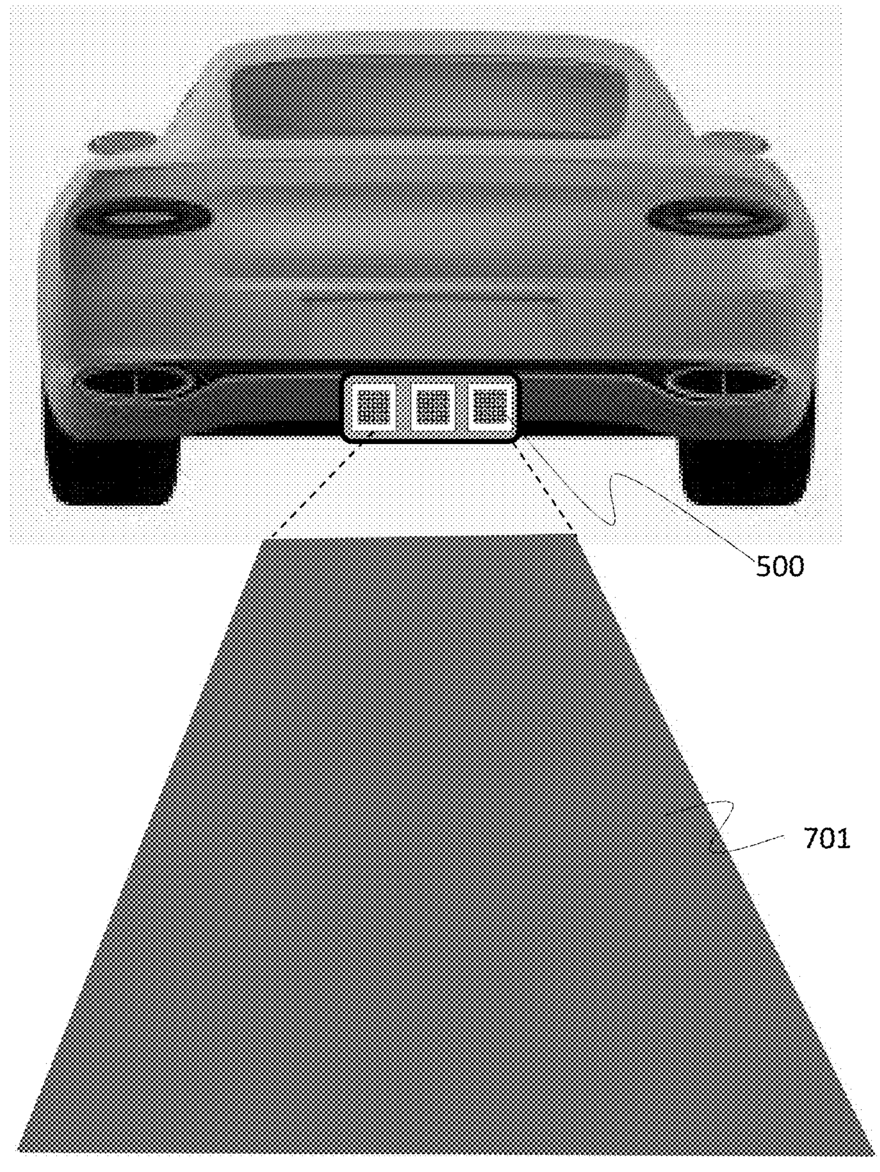
FIG. 8 shows a rear view of a vehicle with the safety system installed and the juxtaposition of vehicle and the illuminated surface area.

In FIG. 8, the backup safety system embodiment (500) is installed on the back end of the vehicle and produces the light pattern (701) on the ground behind the vehicle.

Figure 9:
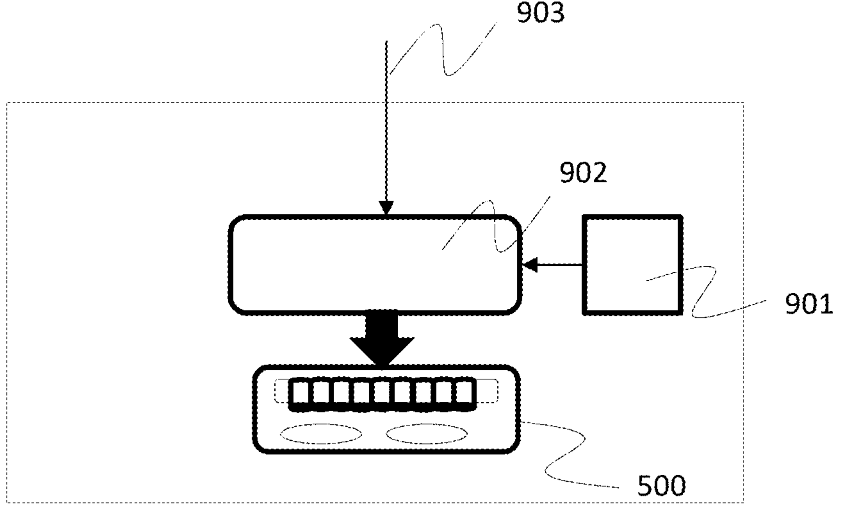
FIG. 9 shows the subsystems that comprise the backup safety system.

FIG. 9 depicts an embodiment of the backup safety system comprising the light-source/lensing subsystem (500) with a lighting-control subsystem (902) receiving continuous light-intensity data from a sensor (901) when the system is turned on by the backup-light power connection (903).

Figure 10:
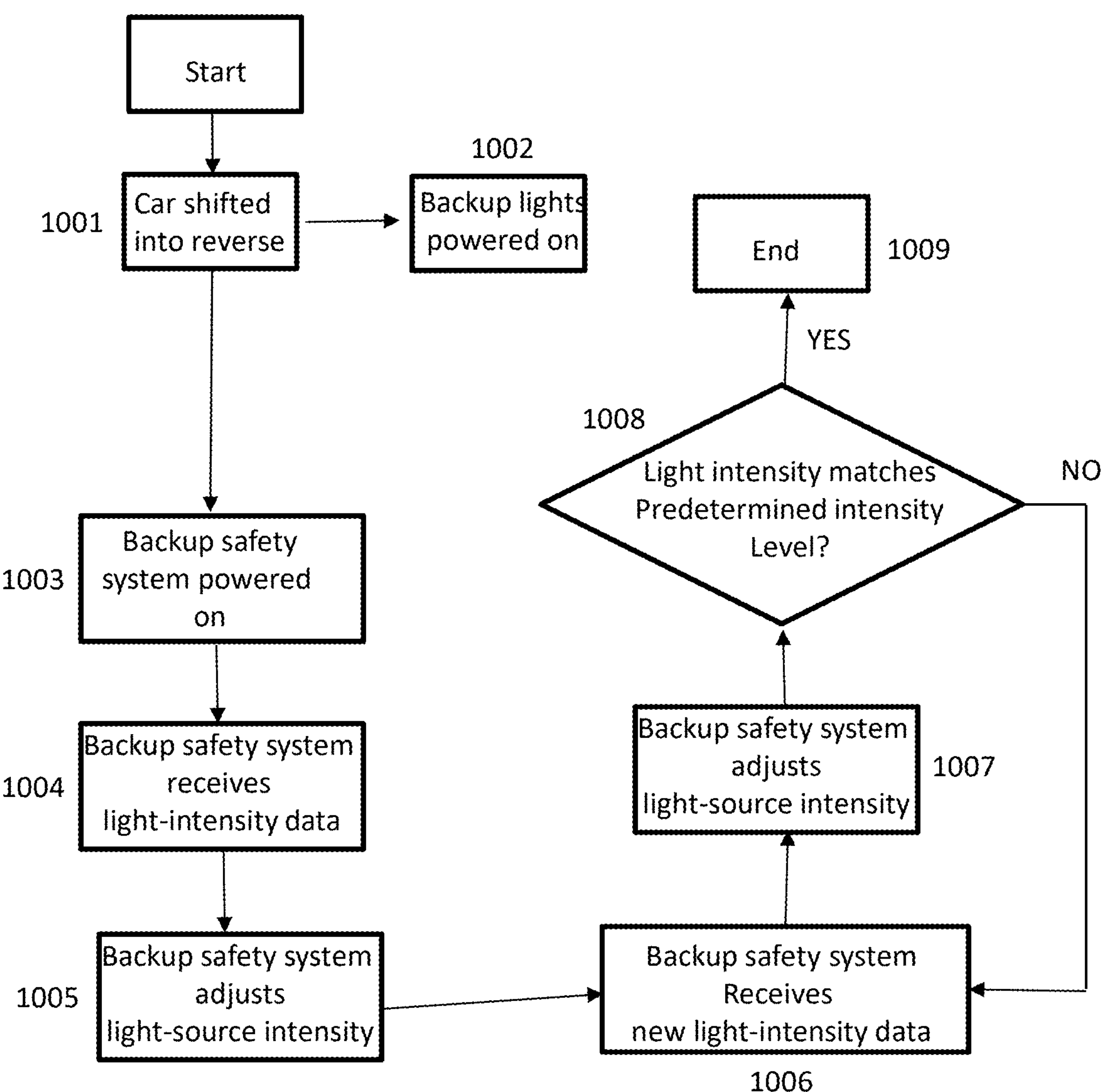
FIG. 10 is a flow diagram that shows a method embodiment for maintaining essentially constant reflected light intensity from the illuminated surface area.

FIG. 10 is a flow diagram of the sequence of steps that occur once the vehicle equipped with the embodiment of the backup safety system is placed in reverse mode (1001), which powers up the backup lights (1002), which simultaneously powers up the backup safety system (1003). As shown, the backup safety system receives light-intensity data from a sensor (1004), prompting the light control system to adjust light intensity output (1005), which causes the sensor data to change and new data is conveyed (1006). This prompts a light-intensity adjustment (1007), creating a closed-loop where adjustments and intensities are evaluated conditionally (1008) until the measured intensity is essentially the same as a predetermined intensity level. Once the intensity measured is essentially the same as the predetermined intensity level, no further adjustments are made.

The drawings and description are exemplary and should not be read as limiting the scope of the invention. It may be implemented as an after-market solution that is adapted to existing vehicles. It may be designed into new cars by original car makers and contained within existing housings. The various subsystems are shown and described as separate subsystems, but the invention could also be modularized into a single module.

The light-source technology may be any technology capable of providing sufficient reflected light intensity over the intended horizontal surface area consistent with vehicular power budgets, overall physical size, and so on.

What is claimed is:

1. A vehicular backup safety system comprising:

a plurality of high-intensity light sources, separate from backup lights;

a plurality of lenses;

the plurality of lenses are operative to merge diverging beams of high-intensity light so as to illuminate a horizontal surface area to the rear of a vehicle, and onto a parking-lot lane so as to signal the vehicle is reversing out of a parking space into the parking-lot lane;

a light-intensity sensor;

a high-intensity-light-source control subsystem; and a vehicle backup-light power input.

2. A system as in claim 1 wherein:

the light-intensity sensor is operative to receive reflected light from the horizontal surface area, behind the vehicle, and convey intensity metric data to the high-intensity-light-source control subsystem.

3. A system as in claim 1 wherein:

the high-intensity-light-source control subsystem receives continuous intensity metric data from the light-intensity sensor; and the high-intensity-light-source control subsystem compares the metric data received from the light-intensity sensor to a predetermined intensity value and adjusts the high-intensity-light-source intensity until the predetermined intensity value is sensed.

4. A system as in claim 1 wherein:

vehicle backup light power turns on the backup safety system whenever a vehicle is placed in reverse gear, and turns off the backup safety system whenever the vehicle is placed in any non-reverse gear, as well as park or neutral.

* * * * *